J. R. SHEAN.
DEVICE FOR INDICATING THE VERTICAL.
APPLICATION FILED SEPT. 5, 1918.

1,297,921.　　　　　　　　　　　Patented Mar. 18, 1919.

Inventor
James R. Shean
by Nestall and Wallace
his Attorneys

UNITED STATES PATENT OFFICE.

JAMES R. SHEAN, OF LOS ANGELES, CALIFORNIA.

DEVICE FOR INDICATING THE VERTICAL.

1,297,921.  Specification of Letters Patent.  Patented Mar. 18, 1919.

Application filed September 5, 1918. Serial No. 252,730.

*To all whom it may concern:*

Be it known that I, JAMES R. SHEAN, a citizen of the United States, residing at Los Angeles, in the county of Los Angeles and State of California, have invented new and useful Improvements in Devices for Indicating the Vertical, of which the following is a specification.

This invention relates to an indicator for showing the direction of the vertical, and is especially adapted for use with aeroplanes.

It is well known that aviators flying at such heights or under such conditions that the ground is obscured, especially when passing through clouds lose their sense of direction of the vertical. It is an object of this invention to provide a device which can be attached to an aeroplane and will indicate to the aviator the relation of his machine to the surface of the ground.

It is another object of this invention to provide an instrument of the character described, which is simple in construction, light in weight, and positive in operation.

It is a further object of this invention to provide an instrument of the character described, which is actuated by gravity.

Figure 1:
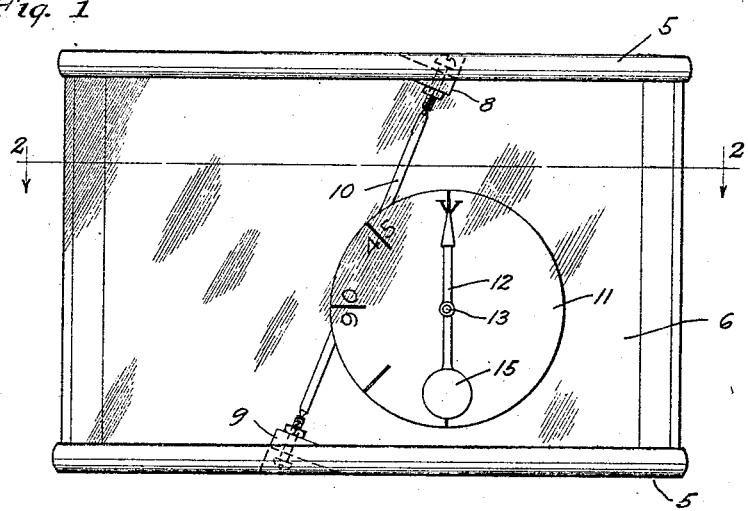
Figure 2:
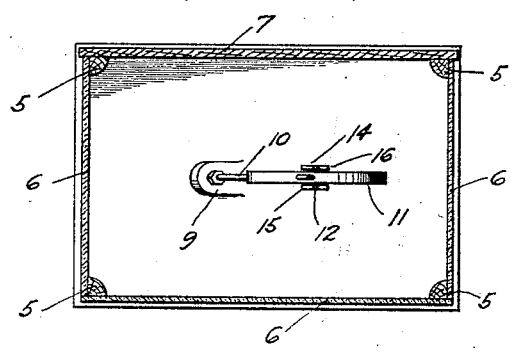
Figure 3:
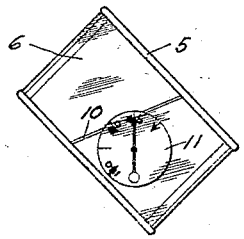
Figure 4:
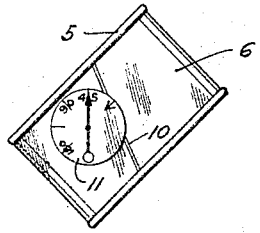

I accomplish these objects by means of the embodiment of my invention illustrated in the accompanying drawing, in which:

Figure 1 is a front view in elevation of the instrument as it appears, when in level or horizontal position. Fig. 2 is a section as seen on the line 2—2 of Fig. 1 on a reduced scale. Figs. 3 and 4 are front views of the instrument showing the dial disposed in position to indicate the relation of the aeroplane to the vertical or horizontal.

Referring more particularly to the drawing, the instrument proper is shown inclosed within a glass case. A frame work is indicated by 5, and mounted in the openings therein are glass panes 6. The back 7 is shown formed of wood, whereby means is provided for attaching the case to an aeroplane, although any other means of attachment may be used.

Disposed within the casing are step bearings 8 and 9, which are herein shown as adjustable. The bearings are so disposed that the shaft 10 supported thereby, is canted with respect to the plane of the base of the casing. Fixed to the shaft 10 with its center of gravity offset from the axis of the shaft is a dial 11. Pivoted to the center of the dial is a pointer 12 forming therewith an indicator. The pointer 12 is fixed to a shaft 13 which is journaled in the dial, and upon the opposite side of the dial there is a similar pointer 14 fixed to the shaft. Pointer 12 has a weight 15 on one end thereof, and pointer 14 has a similar weight 16, so as to cause the pointer to maintain itself in a vertical position and act as a plumb means. The dial has indicia marked thereon as 45 and 90 to indicate the degree of inclination of the instrument, and, therefore, the relation of the aeroplane to the vertical or horizontal.

If it is found that the dial and pointer thereon swing too much before coming to rest, then the casing may be filled with a transparent liquid to steady the movement. A liquid such as alcohol will serve the purpose, and will damp the vibrations of the dial and pointer. However, various other liquids or mediums may be used.

When the aeroplane is in an upright or horizontal position, the dial and pointer will be in the position shown in Fig. 1. Suppose the aeroplane moves straight ahead but dips sidewise to the right making an angle of 45 degrees with the horizontal; the dial will remain with its front face squarely presented to the aviator, but the pointer will move over the dial so as to indicate 45 degrees as shown in Fig. 3. If the aeroplane dips to the left, the dial will swing presenting the rear face to the aviator, and the pointer will indicate the inclination. If the aeroplane dips downwardly in front, the dial will swing on the shaft toward the front positioning the face thereof at an angle to the aviator, the free edge being disposed away from him. If the aeroplane dips upwardly, then the dial will swing toward the rear with the free edge toward the aviator. The position of the dial will indicate the direction of inclination to the horizontal plane. If the aeroplane turns so that the machine is upside down, the dial will swing so that its rear face will be presented to the view of the aviator. The pointer moving over suitable indicia on the rear face of the dial will indicate to the aviator the angle at which the plane is relative to the horizontal. In this position, the dial will also swing forward or backward to indicate whether the machine is directed downwardly or upwardly.

What I claim is:

1. A device of the character described comprising a frame, a shaft journaled therein and canted with respect to the base of the frame, and an indicator fixed to said shaft with its center of gravity offset from the axis of said shaft.

2. A device of the character described comprising a frame, a shaft journaled therein and canted with respect to the base of the frame, and an indicator fixed to said shaft with its center of gravity offset from the axis of said shaft, said indicator having plumb means.

3. A device of the character described comprising a frame, a shaft journaled therein and canted with respect to the vertical, and a dial fixed to said shaft with its center of gravity offset from the axis of said shaft, and plumb means supported from said dial.

4. A device of the character described comprising a frame, a shaft journaled therein and canted with respect to the vertical, a dial fixed to said shaft with its center of gravity offset from the axis of said shaft, and a pointer pivoted at a point outside of its center of gravity.

5. A device of the character described comprising a frame, a shaft journaled therein and canted with respect to the vertical, a dial fixed to said shaft with its center of gravity offset from the axis of said shaft, and pointers mounted on each side of said dial, said pointers being pivotally mounted on said dial at points outside of their centers of gravity.

In witness that I claim the foregoing I have hereunto subscribed my name this 29th day of August, 1918.

JAMES R. SHEAN.

Copies of this patent may be obtained for five cents each, by addressing the "Commissioner of Patents, Washington, D. C."